(12) United States Patent
Matsuyama

(10) Patent No.: US 7,729,027 B2
(45) Date of Patent: Jun. 1, 2010

(54) IMAGE-FORMED OBJECT AND METHOD FOR PRODUCING THE SAME

(75) Inventor: Tetsuya Matsuyama, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 12/414,829

(22) Filed: Mar. 31, 2009

(65) Prior Publication Data

US 2009/0191467 A1     Jul. 30, 2009

Related U.S. Application Data

(62) Division of application No. 11/702,800, filed on Feb. 6, 2007.

(30) Foreign Application Priority Data

Feb. 7, 2006     (JP) ............................. 2006-029656

(51) Int. Cl.
*G03H 1/00*     (2006.01)
(52) U.S. Cl. .......................................... 359/2; 359/900
(58) Field of Classification Search .................. 359/2, 359/567, 900; 430/1, 2
See application file for complete search history.

(56) References Cited

U.S. PATENT DOCUMENTS

| | | | | | |
|---|---|---|---|---|---|
| 4,629,282 | A | * | 12/1986 | McGrew | 359/15 |
| 4,717,221 | A | * | 1/1988 | McGrew | 359/15 |
| 2004/0196516 | A1 | * | 10/2004 | Petersen et al. | 359/15 |

* cited by examiner

*Primary Examiner*—Alessandro Amari
(74) *Attorney, Agent, or Firm*—Ladas & Parry LLP

(57) ABSTRACT

The present invention provides an image-formed object having security property improved, in which, even in the case where the image-formed object comprises a plurality of optical diffraction structures, the presence of each optical diffraction structure is hardly recognized.

An image-formed object comprises a background region where an optical diffraction structure for background focusing a predetermined design as a hologram image at a predetermined image-formation distance, and at least one inset region provided so as to be inset in the background region, wherein, in the inset region, an optical diffraction structure for inset focusing a hologram image of the same design and color as the hologram image of the optical diffraction structure for background is formed at an image-formation distance different from the image-formation distance of the optical diffraction structure for background.

2 Claims, 6 Drawing Sheets

IMAGE-FORMED OBJECT AND METHOD FOR PRODUCING THE SAME

BACKGROUND OF THE INVENTION

1. Field of the Invention

The present invention relates to an image-formed object having a plurality of optical diffraction structures formed, and a method for producing the image-formed object.

2. Description of the Related Art

A method for producing an image-formed object obtained by combining a plurality of optical diffraction structures is already known (for example, the specifications of the U.S. Pat. Nos. 4,629,282 and 4,717,221). According to the production method, the plurality of the optical diffraction structures composing the image-formed object have different patterns from each other.

SUMMARY OF THE INVENTION

According to the conventional image-formed object, presence of each of the plurality of the optical diffraction structures provided in the image-formed object can be easily recognized visually so that each optical diffraction structure can be hardly concealed. Therefore, in the case of using a plurality of optical diffraction structures for a security countermeasure such as counterfeit prevention, a problem is involved in that the presence of each optical diffraction structure can be easily recognized.

Therefore, an object of the present invention is to provide an image-formed object having the security property improved because of making the presence of a plurality of the optical diffraction structures hardly recognizable, and a method for producing the image-formed object.

An image-formed object of the present invention comprises a background region where optical diffraction structure for background is formed, the optical diffraction structure for background focusing a predetermined design as a hologram image at a predetermined image-formation distance, and at least one inset region provided so as to be inset in the background region, wherein, in the inset region, optical diffraction structure for inset is formed, the optical diffraction structure for inset focusing a hologram image of the same design and color as the hologram image of the optical diffraction structure for background, the hologram image being focused at an image-formation distance different from the image-formation distance of the optical diffraction structure for background, and thereby the present invention solves the above problems.

According to the present invention, the optical diffraction structure for inset focuses at an image-formation distance different from that of the optical diffraction structure formed in the background region, a hologram image of the same color and design as the optical diffraction structure formed in the background region, and the optical diffraction structure for inset is provided so as to be inset in the background region. Although the hologram image of each region is focused at a predetermined position, in the case they are observed from viewpoints other than viewpoints from which each of focused holograms can be observed, the hologram image of each optical diffraction structure is observed blurredly. Therefore, the image-formation distances for each hologram image are different, but, since the difference between the distances is not distinct, the holograms are observed such that the same hologram image is blurred, and the border portion between the background region and the inset region is ambiguous. That is, the image-formed object can represent continuous design by the two kinds of optical diffraction structures so that the image-formed object is observed as if it comprises one optical diffraction structure at the first glance.

However, if the viewpoint is moved, since the movement of hologram image is larger for the optical diffraction structure having an image-formation position of hologram image forwardly than the movement for the optical diffraction structure having an image-formation position of hologram image backwardly, owing to the different movement, presence of plural optical diffraction structures can be recognized. Thereby, the hologram image having the image-formation position provided forwardly is observed as if it comes out, and the hologram image having the image-formation position provided backwardly is observed as if it is sunk.

As mentioned above, it is recognized visually that the image-formed object of the present invention comprises plural optical diffraction structures only when it is moved and not recognized that at the first glance. The present invention can provide an image-formed object having a high security property. The image-formation distance denotes the so-called depth of the focused image that is an object (three-dimensional substance) of the optical diffraction structure, that is, the distance between the optical diffraction structure and the image-formation position of the hologram image of the optical diffraction structure. To be inset denotes the state of the inset region which is disposed integrally with the background region without a gap. Hereafter, a hologram image or a state to be observed blurredly because the image is not focused may be described as "unfocused".

The above-mentioned predetermined design may be a ground pattern. In the case where the hologram image is a ground pattern of minute patterns provided evenly in whole, since the hologram images of each optical diffraction structure in an unfocused state are observed almost same, presence of each region can be further hardly recognized. As the ground pattern, for example, a sand pattern, a rough pattern, a beads pattern, a rock pattern, a metal particle pattern, a hair line pattern, or the like can be employed. Since the beads pattern and the metal particle pattern provide a high brightness so as to improve their appearance, they are preferable.

The inset region may be formed into a shape indicating predetermined information. Thereby, although only the presence of the background region can be observed at the first glance, when the viewpoint is moved, the predetermined information formed by the inset region can be recognized by the observer. As the shape indicating predetermined information, letters, marks, graphics, designs, symbols, or the like can be employed.

Both the optical diffraction structures for background and for inset may be other than 0 mm. Since a hologram image having an image-formation distance of 0 mm hardly gets into a blurry state, only the optical diffraction structure for forming that hologram image can be easily recognized visually. Therefore, by setting the image-formation distances of all optical diffraction structures to be other than 0 mm, more viewpoint positions can be obtained, from which the hologram images of all optical diffraction structures can be observed blurrily.

The pattern of the optical diffraction structure for background and the pattern of the optical diffraction structure for inset may be provided adjacently, and the width of the border portion between the patterns may be not more than 10 μm. Thereby, the border portion of the two optical diffraction structures having different image-formation positions can be hardly recognized visually so that the hologram image to be a background and the inset hologram image can be integrated as if only one optical diffraction structure is used at the first glance.

Each of the patterns of the optical diffraction structure for background and the optical diffraction structure for inset may be formed by using a predetermined energy line. As the predetermined energy line, an electron beam and a laser beam can be employed. Since the optical diffraction structure formed by the energy line instead of photography does not have shadows, its presence can be further hardly recognized visually.

A method for the present invention for producing an image-formed object comprising a background region where optical diffraction structure for background is formed and at least one inset region provided so as to be inset in the background region, the optical diffraction structure for background focusing a hologram image of a predetermined design at a predetermined image-formation distance, and the optical diffraction structure for inset focusing a hologram image of the same design and color as the hologram image of the optical diffraction structure for background, the hologram image being focused at an image-formation distance different from the image-formation distance of the optical diffraction structure for background is the method includes a transfer step for each of a plurality of optical diffraction structures, the transfer step has the following steps: superimposing a transfer original plate where transfer pattern of the optical diffraction structure is formed, onto an object to be transferred where a thermoplastic resin layer is laminated on a base member, irradiating a light energy line toward the superimposed portion, transferring the transfer pattern onto the object to be transferred by fusing the resin layer with heat based on the light energy line, and moving irradiation position of the light energy line such that the region corresponding to the optical diffraction structure is formed on the object by transferring the transfer pattern to be transferred.

According to the production method, an image-formed object of the present invention having a high security property can be obtained. As the light energy line, for example, a laser beam can be employed. Moreover, according to the production method, since the pattern of the optical diffraction structure can be formed by the method other than photography, so as not to provide a shadow, presence of each optical diffraction structure can be further hardly recognized visually.

In the transfer step, the transfer pattern may be transferred so that pattern to be formed in the background region and pattern to be formed in the inset region are provided adjacently with a width of border portion between the pattern of the background region and the pattern of the inset region is not more than 10 μm. Thereby, the border portion between the two optical diffraction structures each having different image-formation position can be hardly recognized visually so that the hologram image to be a background and the inset hologram image can be integrated as if only one optical diffraction structure is used at the first glance.

As above mentioned, according to the present invention, the optical diffraction structure for inset is inset in the background region where a predetermined optical diffraction structure for background is formed, the optical diffraction structure for inset focusing at a different image-formation position from the optical diffraction structure for background, a hologram image of the same color and design as the optical diffraction structure for background, and thereby, even in the case of an image-formed object comprising a plurality of optical diffraction structures, presence of each optical diffraction structure can be hardly recognized visually so that an image-formed object having a high security property, or the like can be provided.

DESCRIPTION OF THE PREFERRED EMBODIMENT

Figure 1:
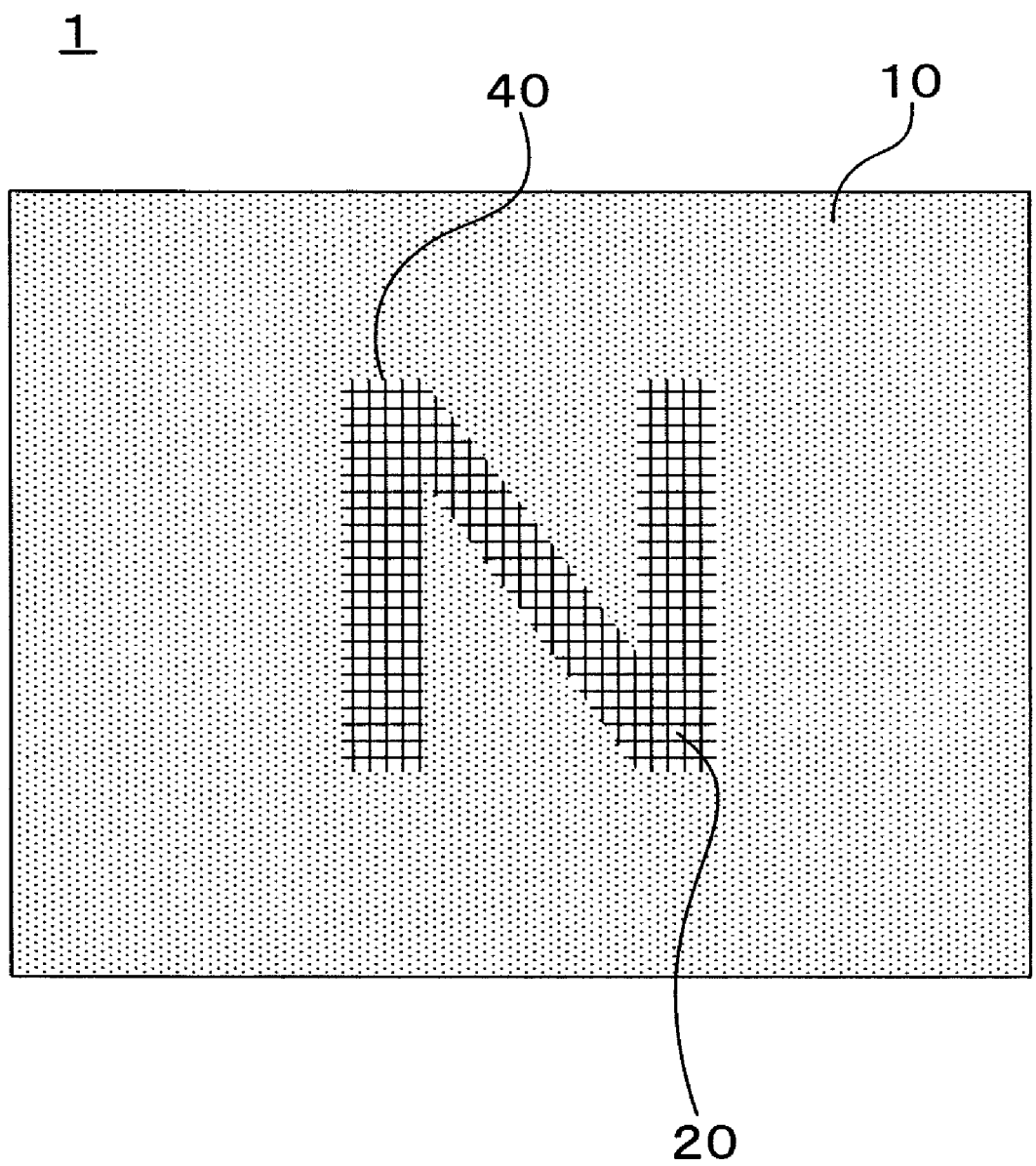
FIG. 1 is a diagram showing an example of an image-formed object of the present invention.

FIG. 1 is a diagram showing an example of an image-formed object 1 of the present invention. The image-formed object 1 comprises a background region 10 where an optical diffraction structure for background is formed and an inset region 20 where an optical diffraction structure for inset is formed. The background region 10 and the inset region 20 are provided adjacently so that the inset region 20 is inset in the background region 10. The optical diffraction structures are a hologram capable of being observed by a white light beam such as a rainbow hologram, each of the structures has a minute rugged pattern for focusing the same beads pattern of the same color as a hologram image, but each of the patterns is focused at different image-formation distance.

Figure 2:
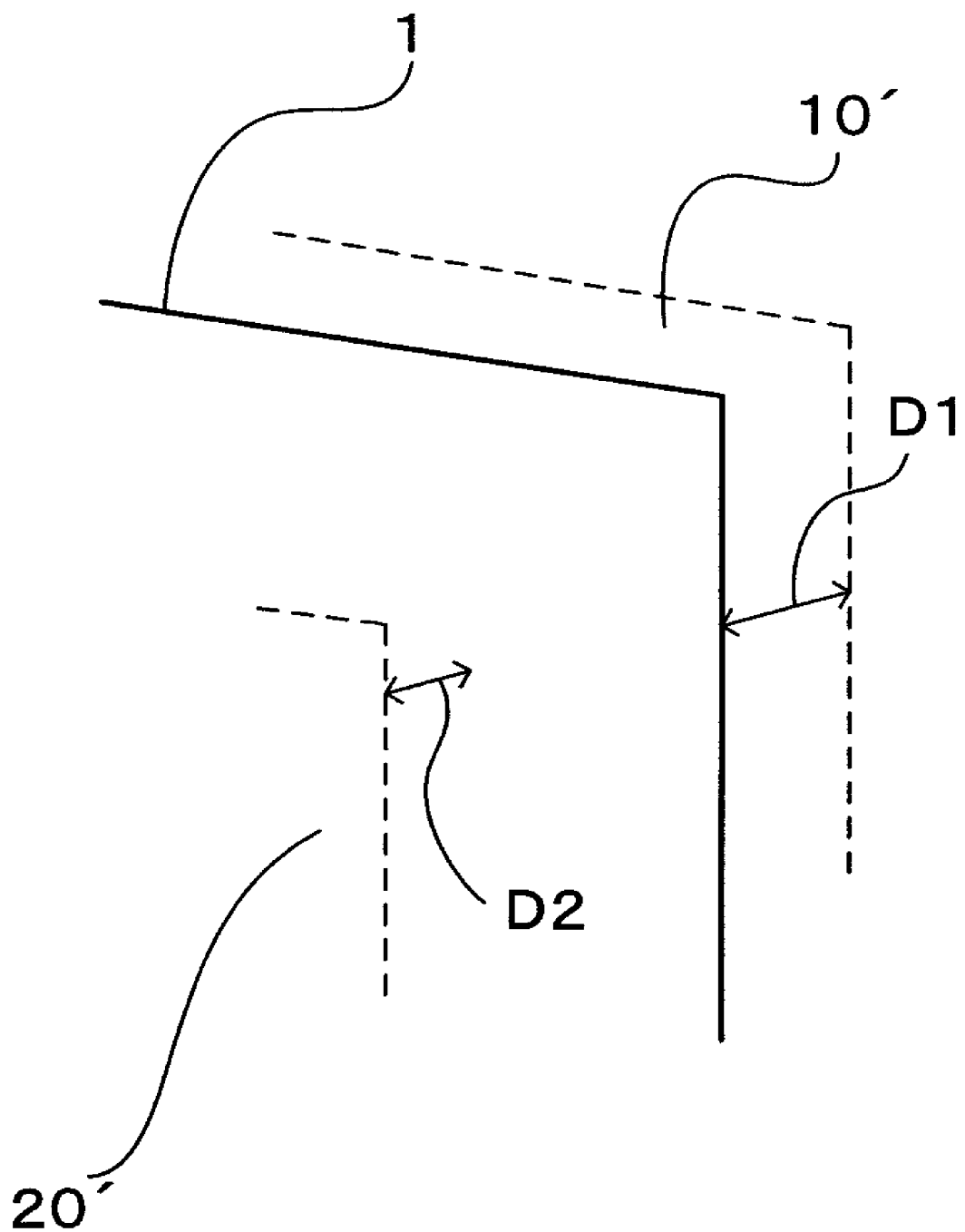
FIG. 2 is a diagram showing the positional relationship between the image-formed object shown in FIG. 1 and the image-formation position of the hologram image.

In the present embodiment, as shown in FIG. 2, the optical diffraction structures are formed such that a hologram image 10' by the optical diffraction structure for background is focused at an image-formation distance D1 of a −4 mm position, and a hologram image 20' by the optical diffraction structure for inset is focused at an image-formation distance D2 of a +2 position, respectively. The image-formation distance is a distance between the optical diffraction structure and the image-formation position of the hologram image caused by the optical diffraction structure. As the image-formation distance is larger in plus direction, the hologram image is observed as if it comes out more forwardly, and as the image-formation distance is larger in a minus direction, the hologram image is observed as if it is sunk more backwardly.

In the image-formed object 1, the inset region 20 is provided with a shape of letter "N", and the background region 10 is provided as the background of the inset region 20. At the first glance, the hologram images of the optical diffraction structures are in a blurry state out of focus. As mentioned above, since the hologram images of the present embodiment represent a beads pattern, that is, a ground pattern such that a predetermined design spreads uniformly, the background region and the inset region are observed as the similar designs in the blurry state. Therefore, since the border of the regions is ambiguous, it is hard to recognize the presence of the inset region. That is, at the first glance, the inset region is observed integrally with the background region so that the image-formed object 1 is observed as if only one optical diffraction structure is provided therein.

However, if the image-formed object is observed by moving the viewpoint, since the movements of the hologram images of the optical diffraction structures differ from each other, the presence of the two regions can be recognized. In the present embodiment, the inset region 20 of the letter "N" is observed as if it comes out and the background region 10 is observed as if it is sunk compared with the inset region 20. Moreover, since the hologram images with the different image-formation positions are observed adjacently with respect to a border portion 40, which is line-shaped, hologram images with different depths can be represented without bumps. Therefore, although the image-formed object 1 is observed as a whole as if it comprises only one optical diffraction structure, by moving the viewpoint, the presence of plural diffraction structures can be recognized, and furthermore, from the viewpoint position for focusing the hologram image of the optical diffraction structure for inset, the inset region, that is, the shape of letter "N" can be recognized clearly in a coming out state.

Figure 3A:
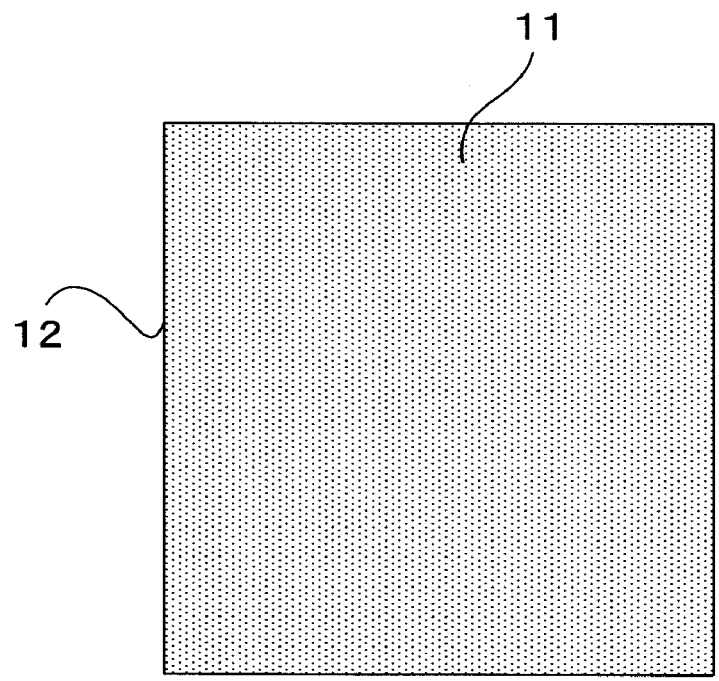
FIG. 3A is a diagram showing a first transfer original plate.
Figure 3B:
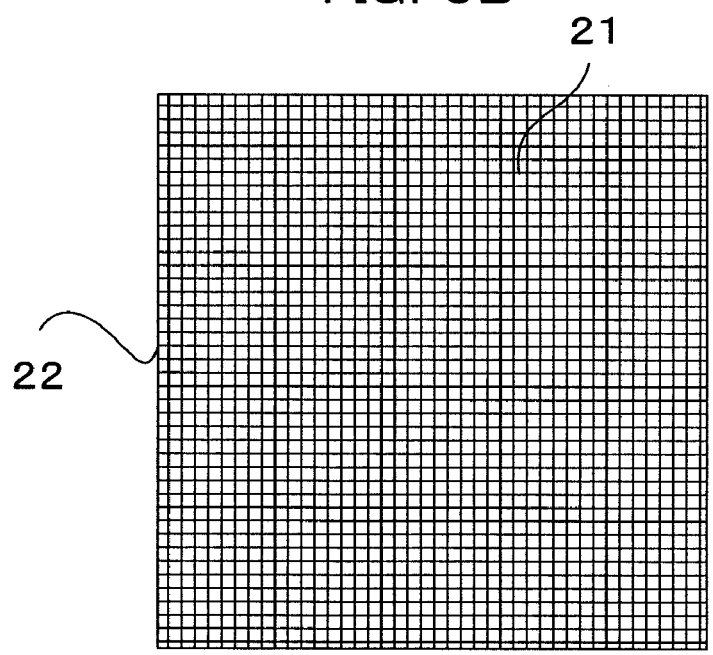
FIG. 3B is a diagram showing a second transfer original plate.
Figure 4:
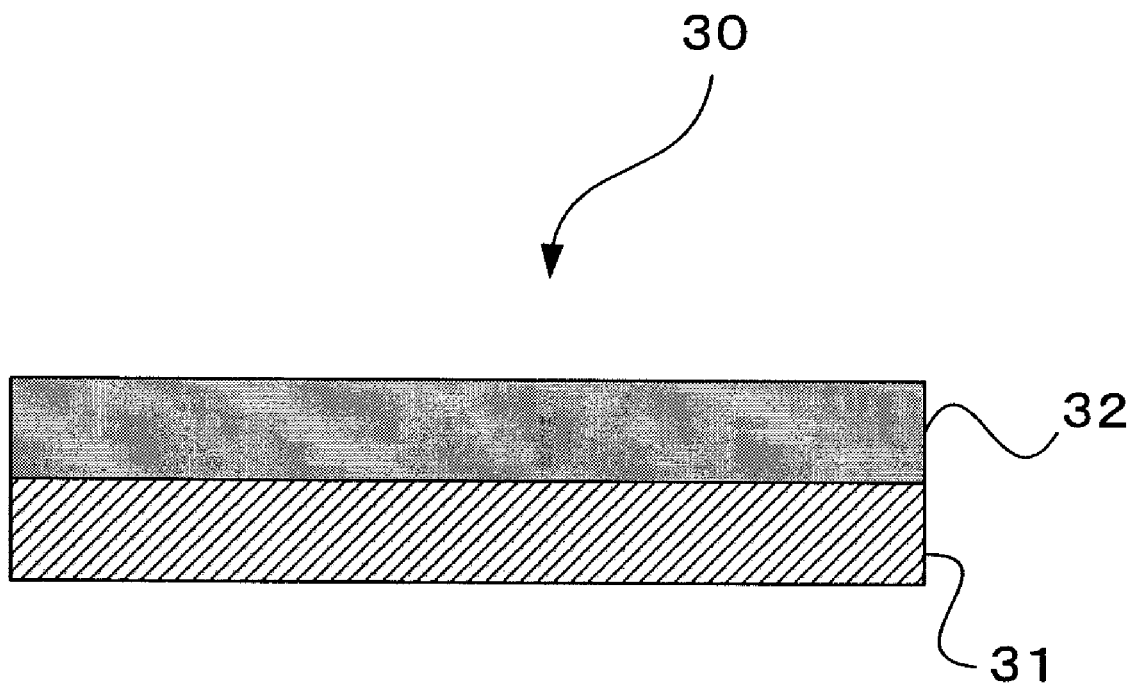
FIG. 4 is a cross-sectional view showing an example of an object to be transferred of the present invention.

Hereafter, the method for producing the image-formed object 1 will be explained. In the present embodiment, the image-formed object 1 is produced by using a first transfer original plate 12 where a transfer rugged pattern 11 for the optical diffraction structure for background shown in FIG. 3A is formed and a second transfer original plate 22 where a transfer rugged pattern 21 for the optical diffraction structure for inset shown in FIG. 3B is formed, respectively, and transferring the transfer rugged patterns 11, 12 onto an object to be transferred 30 shown in FIG. 4. The object to be transferred 30 has a thermoplastic resin layer 32 such as a wax laminated on a base material layer 31. The material for the base material layer 31 may be determined appropriately according to the application of the image-formed object 1 as it will be described later. The resin layer 32 contains a catalyst for converting light into heat. To the object to be transferred 30, a photo thermal conversion layer comprising a catalyst for converting light into heat may be provided independently of the resin layer 32.

The transfer original plates 12, 22 may be obtained by the following procedure for instance. First, the image patterns each of the optical diffraction structure for background and the optical diffraction structure for inset are produced. From the produced image patterns, graphic data for each of the transfer rugged patterns 11, 21 is produced. Based on the graphic data, the transfer original plates 12, 22 are produced by drawing the transfer rugged patterns 11, 21 by photography or EB (electron beam) drawing, respectively. Hereafter, the transfer rugged patterns 11, 22 may be referred to as the patterns 11, 22.

Hereafter, the method for transferring the patterns 11, 21 from the transfer original plates 12, 22 onto the object to be transferred 30 will be explained. The present embodiment comprises a first transfer step for transferring the pattern 11 of the first transfer original plate 12, and a second transfer step for transferring the pattern 21 of the second transfer original plate 22. Although the first transfer step is first carried out and then the second transfer step is carried out in the present embodiment, they may be carried out in the opposite order.

Figure 5A:
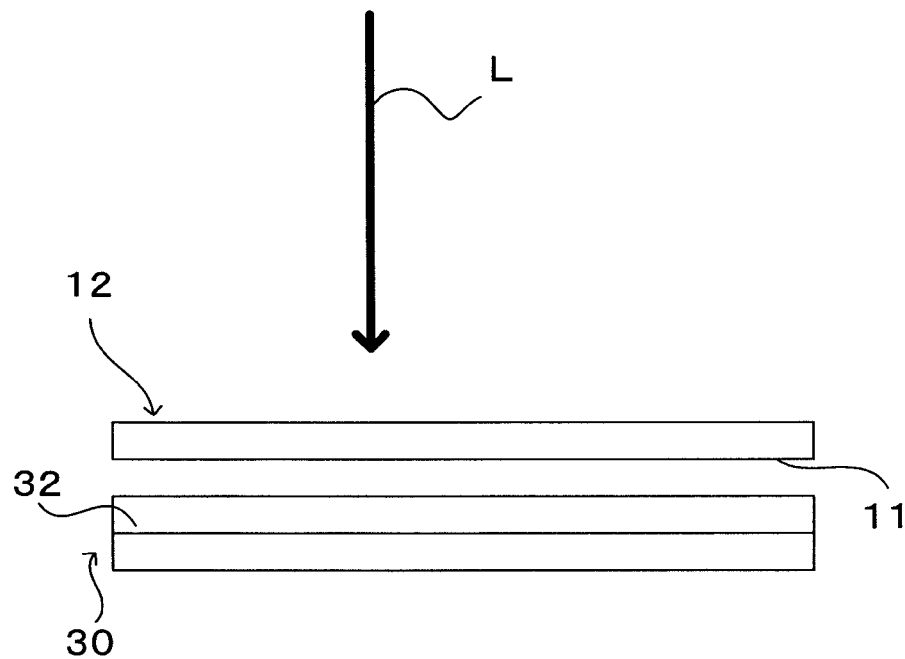
FIG. 5A is a cross-sectional view showing the state of the laser beam irradiation to a portion where the transfer original plate and the object to be transferred are superimposed.

First, as shown in FIG. 5A, the resin layer 32 of the object to be transferred 30 and one side of the first transfer original plate 12 where the pattern 11 of is formed are superimposed. A laser beam L as the light energy line is directed toward the superimposed portion. Although the laser beam L is directed from the side of the first transfer original plate 12 in the present embodiment, it may be directed from the side of the object to be transferred 30. Since the light of the laser beam L is converted to heat at the irradiation position of laser beam L, the resin layer 32 is melted by the heat so that the superimposed pattern 11 is transferred to the resin layer 32.

Figure 5B:
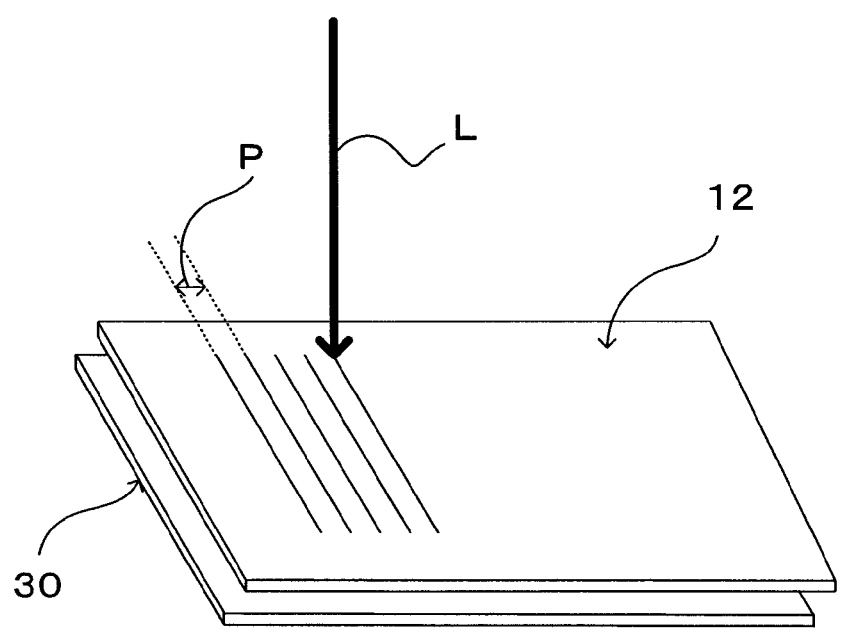
FIG. 5B is a diagram showing the state of moving the laser beam irradiation position.

As shown in FIG. 5B, the laser beam L is moved linearly at a predetermined rate. According to the movement of laser beam L, the irradiation range is moved. Since the irradiation range is extremely small, when the resin layer 32, which has been in the irradiation range, gets out of the irradiation range, is cooled down and cured immediately without a cooling device. Therefore, since the resin layer is cured to be molded into the shape of the pattern 11 of the first transfer original plate 12, the optical diffraction structure for background is transferred onto the resin layer 32. The laser beam L is moved linearly at a predetermined irradiation pitch P for transferring the pattern 11 of the first transfer original plate 12 in the range to be transferred. The irradiation pitch P and the moving rate of the laser beam L may be set appropriately according to the laser power of the laser beam L.

Figure 6:
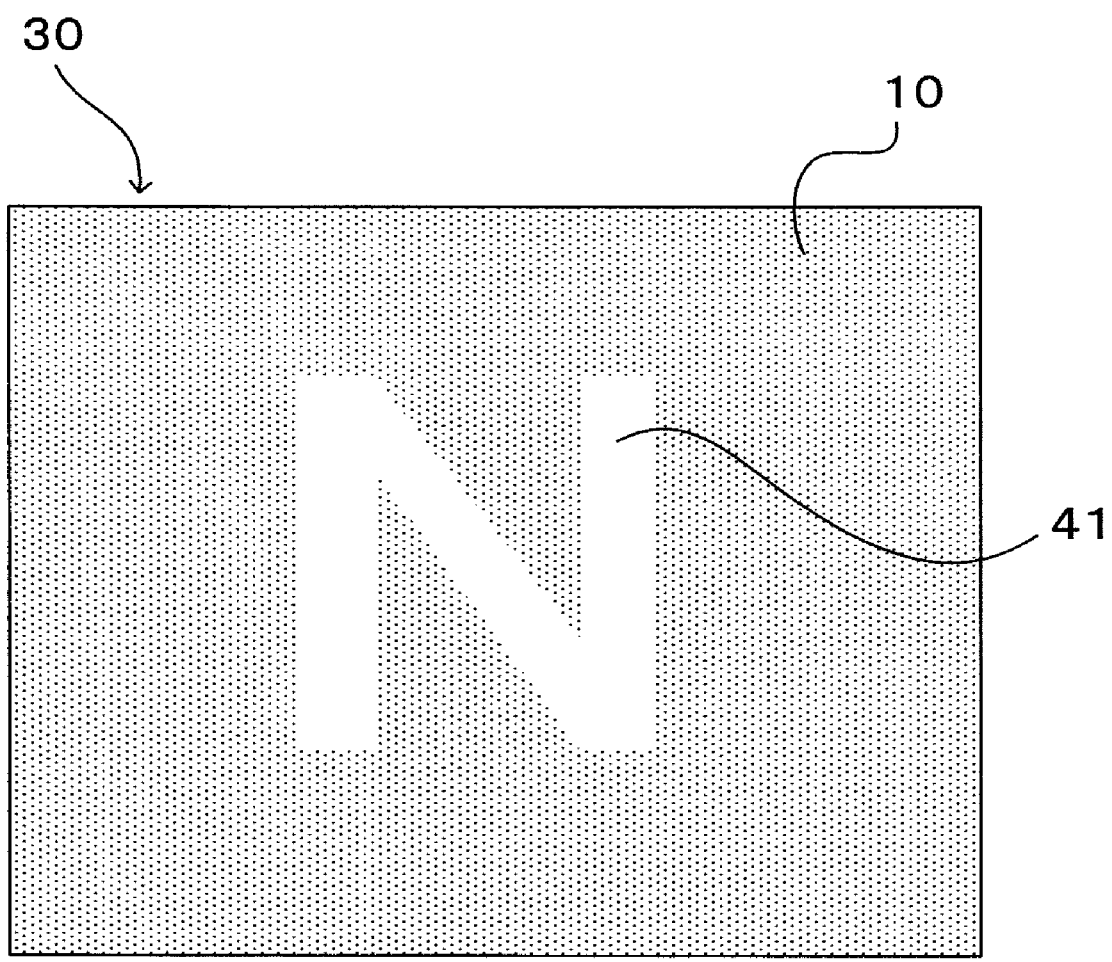
FIG. 6 is a diagram showing the state that an optical diffraction structure for background is formed in the background region except an inset region.

According to the transfer procedure mentioned above, the transfer procedure is carried out successively onto the object to be transferred 30 such that only the background region 10 is formed with the pattern 11 of the first transfer original plate 12. That is, the pattern 11 is transferred successively onto the resin layer 32 by moving the irradiation position of the laser beam L except portion for the inset region 20 to be formed. As to the control of irradiating the laser beam L and the movement of the irradiation position, a control device for the control thereof may be connected with an irradiation device of laser beam L for carrying out the control. FIG. 6 shows the state where the background region 10 has been formed with the optical diffraction structure for background by transferring the pattern 11 except an untransferred region 41, which is a shape of letter "N", for the inset region 20 to be formed.

Next, the second transfer step will be explained. In the second transfer step, the pattern 21 of the second transfer original plate 22 is transferred onto the resin layer 32 in the same procedure as in the transfer method for the first transfer original plate 12. However, in the transfer of the second transfer original plate 22, the irradiation position movement of laser beam L should be controlled such that the untransferred region 41 is filled up. Thereby, the inset region 20 formed with the optical diffraction structure for inset can be obtained. In this transfer step, the inset region 20 is formed such that the width of the border portion 40 between the inset region 20 and the background region 10, that is, the joint portion between the inset region and the background region, where no diffraction structure is transferred, is not more than 10 μm. After finishing the first and second transfer steps, a metal deposition adequate for the beads pattern is carried out so as to produce the image-formed object 1 of the present invention.

As mentioned above, since optical diffraction structure is formed each for the background region 10 and the inset region 20, the border portion 40 of these regions 10, 20 are linked seamlessly, and furthermore, since they are same colored, a hologram to be observed as one flat ground pattern at the first glance can be produced.

By using the base material layer 31 according to the purpose of the use of the image-formed object 1, the image-formed object 1 can be used in various embodiments. For example, it may be provided on a part of or whole of a credit card, a valuable security, a certificate document, or the like. Moreover, it may be also used as a certification seal to be attached onto the merchandise or a merchandise package.

Furthermore, a hologram formed layer where the image-formed object 1 is formed may be laminated on the base material layer together with a peeling layer and an adhesive layer by a conventionally known method to produce a transfer ribbon.

The present invention is not limited to the above-mentioned embodiment and it may be carried out in various embodiments. It is enough that the image-formation distance D1 of the optical diffraction structure for background and the image-formation distance D2 of the optical diffraction structure for inset is different from each other, and the image-formation distance D2 of the optical diffraction structure for inset can be deeper. The shape of the inset region 20 is not limited to a letter but it may be also a specific shape of a numeral, a mark, a graphic, a symbol, or the like, and it may be an unspecific shape. Moreover, a plurality of the inset regions 20 may be provided so as to be inset in the background region 10. For example, a letter row of "DNP", or the like for providing a certain meaning can be formed by a plurality of the inset regions 20. At the moment, it does not matter which the optical diffraction structures for inset for forming the inset regions 20 are the same or different.

Moreover, in the case of providing a plurality of the inset regions, they may be provided either distantly or adjacently with each other. The optical diffraction structures formed on the image-formed object of the present invention may be formed directly by irradiating an electron beam. It is enough that the width of the border portion between the optical diffraction structures is not more than 10 μm, and it can be 1 μm or less.

What is claimed is:

1. A method for producing an image-formed object comprising a background region where optical diffraction structure for background is formed and at least one inset region provided so as to be inset in the background region, the optical diffraction structure for background focusing a hologram image of a predetermined design at a predetermined image-formation distance, and the optical diffraction structure for inset focusing a hologram image of the same design and color as the hologram image of the optical diffraction structure for background, the hologram image of the inset region being focused at an image-formation distance different from the image-formation distance of the optical diffraction structure for background, wherein a transfer step is included for each of a plurality of optical diffraction structures, the transfer step has the following steps:

superimposing a transfer original plate where transfer pattern of the optical diffraction structure is formed, onto an object to be transferred where a thermoplastic resin layer is laminated on a base member, irradiating a light energy line toward the superimposed portion, transferring the transfer pattern onto the object to be transferred by fusing the resin layer with heat based on the light energy line, and moving irradiation position of the light energy line L such that a region corresponding to the optical diffraction structure is formed on the object to be transferred with the transfer pattern to be transferred.

2. The method for producing an image-formed object according to claim 1, wherein in the transfer step, the transfer pattern is transferred so that pattern to be formed in the background region and pattern to be formed in the inset region are provided adjacently with a width of border portion between the pattern of the background region and the pattern of the inset region is not more than 10 μm.

\* \* \* \* \*